United States Patent
Van Bemmel

(10) Patent No.: US 7,668,140 B2
(45) Date of Patent: Feb. 23, 2010

(54) ROAMING BETWEEN WIRELESS ACCESS POINT

(75) Inventor: Jeroen Van Bemmel, Zuid (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 311 days.

(21) Appl. No.: 11/126,830

(22) Filed: May 11, 2005

(65) Prior Publication Data
US 2006/0256750 A1    Nov. 16, 2006

(51) Int. Cl.
*H04W 4/00* (2009.01)
(52) U.S. Cl. .................... 370/331; 370/338; 455/432.1; 455/436
(58) Field of Classification Search .......... 370/331, 370/338, 401, 329, 332, 400; 455/432.1, 455/435.1, 436–444, 524, 525, 552.1, 433, 455/435.2
See application file for complete search history.

(56) References Cited

U.S. PATENT DOCUMENTS

| | | | | |
|---|---|---|---|---|
| 7,333,454 | B2 * | 2/2008 | Yang et al. | 370/331 |
| 7,385,957 | B2 * | 6/2008 | O'Neill | 370/338 |
| 2006/0109814 | A1 * | 5/2006 | Kuzminskiy et al. | 370/329 |
| 2006/0116127 | A1 * | 6/2006 | Wilhoite et al. | 455/442 |
| 2006/0223526 | A1 * | 10/2006 | Qi et al. | 455/432.1 |
| 2006/0223527 | A1 * | 10/2006 | Lee et al. | 455/432.2 |
| 2007/0160017 | A1 * | 7/2007 | Meier et al. | 370/338 |
| 2007/0223420 | A1 * | 9/2007 | Hori et al. | 370/331 |

* cited by examiner

*Primary Examiner*—Patrick N Edouard
*Assistant Examiner*—Anthony S Addy
(74) *Attorney, Agent, or Firm*—Williams, Morgan & Amerson, PC

(57) ABSTRACT

The present invention provides a method and an apparatus for roaming between wireless access points with relatively less disruptions to a service in handovers. In one embodiment, a method of communication in a wireless network that includes an access point and a target access point comprises detecting an indication of roaming to the target access point at a mobile terminal associated with the access point and communicating with the target access point using an existing communication link between the mobile terminal and the access point to prepare the mobile terminal for a handover event from the access point to the target access point in response to detecting the indication of roaming. The mobile terminal may communicate with the target access point via a backend channel to prepare for an actual handover to the target access point. By enabling a make-before-break connection, the mobile terminal may proactively prepare a connection to a next access point through a currently existing link to an access point. Use of a proxy access point, in a communication system, may reduce connection delays experienced when a user of a wireless communication device, such as a mobile or wireless terminal roams between access points.

23 Claims, 5 Drawing Sheets

ROAMING BETWEEN WIRELESS ACCESS POINT

FIELD OF THE INVENTION

This invention relates generally to telecommunications, and more particularly, to wireless communications.

DESCRIPTION OF THE RELATED ART

Availability of wireless connectivity in a variety of public places provides increased mobility to users. For mobile users, a wireless network generally supports a host of applications and services by interfacing with other wireless and/or wired networks. To this end, an Institute of Electrical and Electronics Engineers (IEEE) 802.11 standard specifies an over-the-air interface between a wireless client and a base station or between two wireless clients. The IEEE 802.11 standard refers to a family of specifications developed by the IEEE for wireless local area network (LAN) technology. For example, an IEEE standard called 802.11b and commercially known as Wi-Fi is specified to operate wireless LANS with ease and at faster communication rates. The IEEE 802.11 standard based wireless networks form a shared medium in an unlicensed spectrum. The IEEE 802.11 standard specification published in 1997 and is available from IEEE Operations Center, 445 Hoes Lane, Piscataway, N.J., 08854-1331, USA.

A wireless network generally includes a plurality of access points (APs) (often called base stations in case of cellular networks). An access point provides a point of connection for wireless communication devices including mobile terminals. For example, mobile terminals establish a radio connection with a particular access point (typically one, but possibly multiple). The establishment of a logical link between the mobile terminal and the access point involves exchanging several protocol messages, which takes time. Due to the separation of functionality into different layers (according to the Open System Interconnection (OSI) model—a seven layer model developed by International Organization for Standardization (ISO) for standardizing data transmission) there are several levels at which a connection must be re-established when a terminal changes access points. In particular, for IEEE 802.11a/b/g based networks this adds up (physical layer, link layer, network layer, transport layer, possibly application layer), which results in a relatively long period during which no communication is possible.

Accordingly, a wireless communication device faces a host of challenges with mobility, e.g., staying connected to a wireless network to provide a wireless service to a user that keeps moving around. One particular such challenge is roaming, the moment a handover takes place from one point of attachment to the network to the next one. For example, a wireless local area network (LAN) lets users roam around a building with a laptop (equipped with a wireless LAN card) and stay connected to their network without being connected to a wire. The wireless LANs transfer data through the air using radio frequencies instead of cables, requiring a wired access point that connects a plurality of wireless communication devices into a wired network.

Roaming introduces many undesirable effects in user connectivity and delivery of services because during this process connectivity is momentarily lost, which causes disruption of a wireless service. A typical roaming situation entails a user at a mobile terminal moving away from an IEEE 802.11 standard-compliant access point to which the mobile terminal is connected for providing a wireless service. As the mobile terminal continues to move away from the access point, the signal/noise level drops due to attenuation, for example, until at some point the connection can no longer be maintained and wireless connectivity to the wireless network is lost. The mobile terminal scans for a new access point (in up to fourteen frequency bands, e.g.), associates with the new AP, performs Dynamic Host Configuration Protocol (DHCP) discovery to obtain an Internet Protocol (IP) address for a protocol that assigns dynamic IP addresses to devices on a network, is presented with a web form to do authentication, and then reestablishes desired Transmission Control Protocol (TCP)-based connections. Generally, this entire process takes a few seconds. In this way, a handover event between access points may occur.

Several approaches are proposed to facilitate smooth handovers between access points, such as the IEEE 802.11 standard-compliant access points. For instance, one approach calls for use of a network layer referred to as mobile IP to provide applications with a virtual IP address that does not change during roaming, such that higher layers (transport layer, application layer) are not affected. More specifically, the mobile IP layer introduces an additional layer (tunnel) which increases overhead for general communications, employs special terminal software and introduces additional delay due to registration with a home agent being a router on a mobile node's home network, which tunnels datagrams for delivery to a mobile node when it is away from home, and maintains current location information for the mobile node, which send an initial access request to a mobility agent.

However, only a few applications may benefit from the use of the mobile IP layer. In particular, web browsing, reading email and other applications based on short-lived TCP connections usually fail to perform any better than without the use of the mobile IP layer. Other applications, including User Datagram Protocol (UDP) based applications such as Voice over IP (VoIP) and streaming, may be better served with different approaches, such as Session Initiation Protocol (SIP), which is a multimedia and telephony protocol that provides services including call forwarding, number delivery, authentication and other telecom applications based an Internet standard used to initiate, manage, and terminate interactive sessions between one or more users on the Internet.

Another approach for the IEEE 802.11 standard specific techniques/protocols such as Inter Access Point Protocol (IAPP), reduces link layer authentication delays by proactively sharing an authentication state between the access points. However, the IAPP based approach only reduces authentication delay and is inefficient in that the authentication state is proactively shared with a set of neighboring access points, while, at most, only one of the access points may desire such information. Additionally, other vendor implemented proprietary schemes also facilitate such link layer handovers. Again, such schemes also fail to provide an efficient way to reduce the time during which no connection is available to mitigate undesirable effects of roaming.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for communication in a wireless network that includes an access point and a target access point. The method comprises detecting an indication of roaming to the target access point at a mobile terminal associated with the access point and communicating with the target access point using an existing communication link between the mobile terminal and the access point to prepare the mobile terminal for a handover event from the access point to the target access point in response to detecting the indication of roaming.

In another embodiment, a method is provided for communication in a wireless network that includes an access point and a target access point. The method comprises detecting an indication of roaming to the target access point for a mobile terminal at the access point associated therewith and in response to detecting the indication of roaming, communicating with the target access point using an existing communication link between the mobile terminal and the access point to prepare the mobile terminal for a handover event from the access point to the target access point.

In yet another embodiment, a mobile terminal that associates with a wireless network including an access point and a target access point comprises a transceiver and a storage coupled to the transceiver. The storage may store instructions to detect an indication of roaming to the target access point from the access point and to cause the transceiver to communicate with the target access point using an existing communication link between the mobile terminal and the access point to prepare the mobile terminal for a handover event from the access point to the target access point in response to detection of the indication of roaming.

In still another embodiment, an access point that associates with a mobile terminal in a wireless network including a target access point comprises a transceiver and a storage coupled to the transceiver. The storage may store instructions to detect an indication of roaming to the target access point from the access point for the mobile terminal and to cause the transceiver to communicate with the target access point using an existing communication link between the mobile terminal and the access point to prepare the mobile terminal for a handover event from the access point to the target access point in response to detection of the indication of roaming.

In one exemplary embodiment, a communication system comprises a wireless network that includes an access point and a target access point each capable of communicating with a mobile terminal. The mobile terminal includes a first transceiver and a first storage coupled to the transceiver. The first storage may store instructions to detect an indication of roaming to the target access point from the access point and to cause the first transceiver to communicate with the target access point using an existing communication link between the mobile terminal and the access point to prepare the mobile terminal for a handover event from the access point to the target access point in response to detection of the indication of roaming.

In yet another illustrative embodiment, an article comprising a computer readable storage medium storing instructions that, when executed cause a communication system, in which a mobile terminal associates with a wireless network that includes an access point and a target access point, to detect an indication of roaming to the target access point at the mobile terminal associated with the access point and communicate with the target access point using an existing communication link between the mobile terminal and the access point to prepare the mobile terminal for a handover event from the access point to the target access point in response to detection of the indication of roaming.

In one further exemplary embodiment, an article comprising a computer readable storage medium storing instructions that, when executed cause a communication system, in which a mobile terminal associates with a wireless network that includes an access point and a target access point, to detect an indication of roaming to the target access point for the mobile terminal at the access point associated therewith and communicate with the target access point using an existing communication link between the mobile terminal and the access point to prepare the mobile terminal for a handover event from the access point to the target access point in response to detection of the indication of roaming.

BRIEF DESCRIPTION OF THE DRAWINGS

The invention may be understood by reference to the following description taken in conjunction with the accompanying drawings, in which like reference numerals identify like elements, and in which.

Figure 1:
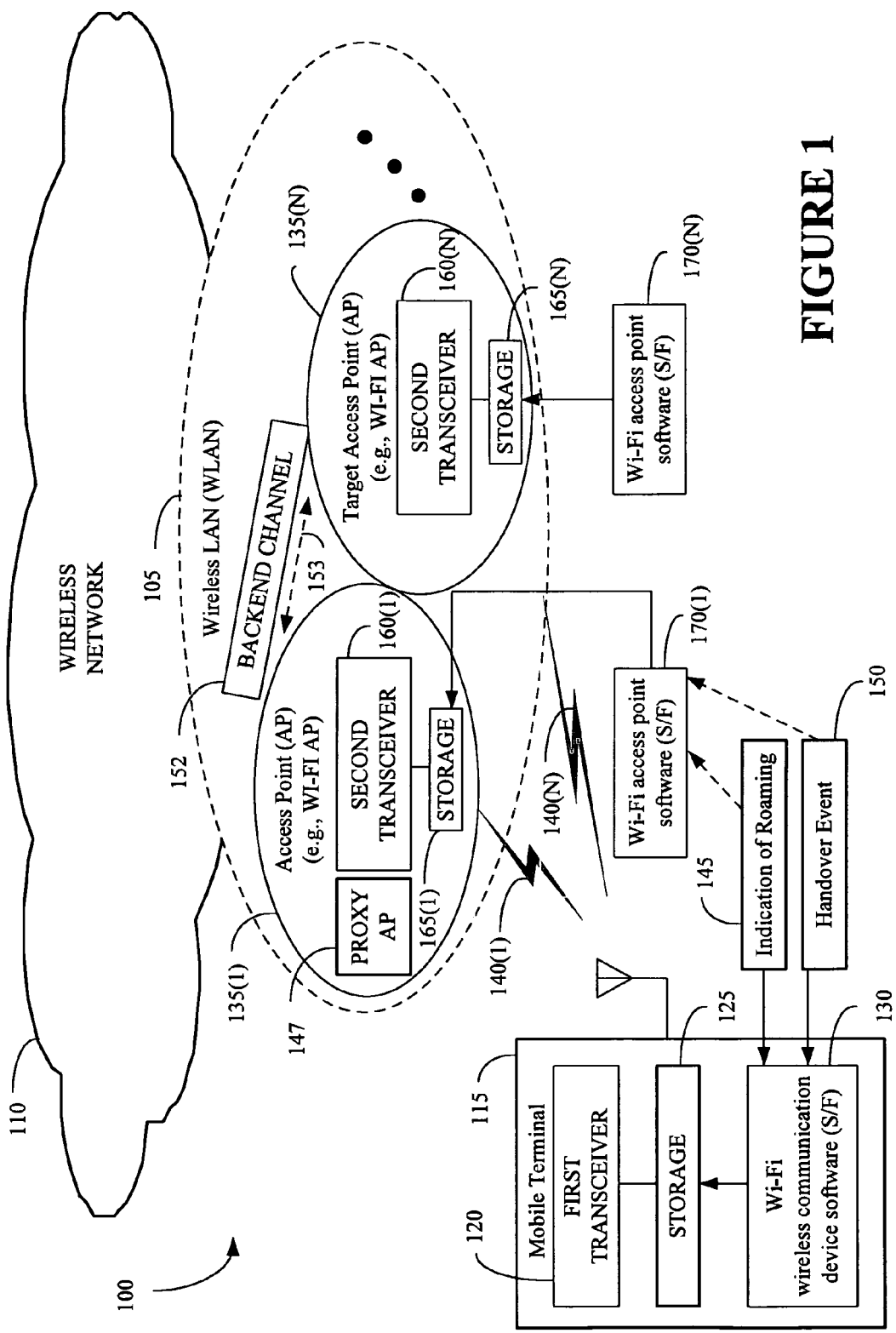
FIG. 1 schematically depicts a communication system that may reduce disruptions to a service in handovers based on roaming includes a wireless local area network associated with a wireless network in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus is provided for roaming between wireless access points with relatively less disruptions to a service in handovers. In one embodiment, a method of communication in a wireless network that includes an access point and a target access point comprises detecting an indication of roaming to the target access point at a mobile terminal associated with the access point and communicating with the target access point using an existing communication link between the mobile terminal and the access point to prepare the mobile terminal for a handover event from the access point to the target access point in response to detecting the indication of roaming. To reduce connection delays experienced when a user of a wireless communication device, such as a mobile or wireless terminal is roaming between access points, the terminal communicates with a target access point via a backend channel to prepare for an actual handover to the target access point. By enabling a make-before-break connection, the mobile terminal may proactively prepare a connection to a next access point through a currently existing link to an access point. Interaction to establish a link to the next access point may be done with the next access point in advance to the actual handover. In this way, the actual handover then only establishes the link layer connectivity, i.e., association between the mobile terminal and the next access point in a matter of relatively short period, such in milliseconds. This significantly reduces the period during which communication may not be available. For realizing this reduction in connection delays, in one embodiment, a proxy access point which is a logical representation of an actual access point may be used. A proxy access point may function as a real access point that is being represented, except that communication with the proxy access point takes place over an existing connection instead of over a radio interface of the real access point. The mobile terminal associates with the proxy access point and traffic is forwarded to the real access point, which treats this traffic as if it were coming in over a radio frequency link. To reduce the time between associations, the proxy access point may provide information on a channel on which the real access point is transmitting such that the mobile terminal skips a probing phase.

Referring to FIG. 1, a communication system 100 that may reduce disruptions to a service in handovers based on roaming is schematically depicted to include a wireless local area network (WLAN) 105 associated with a wireless network 110, such as a local area network (LAN), in accordance with one embodiment of the present invention. A wireless communication device, for example, a mobile terminal 115 may associate with the wireless LAN 105 to connect a user to the wireless network 110. In one embodiment, the mobile terminal 115 includes a first transceiver 120 coupled to a storage 125 that may store client software, such as a Wi-Fi enabled communication device software (S/F) 130. The term Wi-Fi, short for wireless fidelity is promulgated by the Wi-Fi Alliance to refer any type of the IEEE 802.11 standard based device or network, whether 802.11a, 802.11b, 802.11g, dual-band, and the like. The Wi-Fi Alliance is an industry alliance to promote wireless networking arrangements according to the IEEE 802.11 specification.

To support mobile communications, the wireless LAN 105 may comprise a Wi-Fi network that includes a multiplicity of access points (APs) 135(1-N). In one embodiment, the Wi-Fi enabled communication device software (S/F) 130 may comprise instructions that significantly reduce connection delays experienced by the mobile terminal 115 when a user roams between access points of the multiplicity of access points 135(1-N). By reducing such connection delays associated with handover of the mobile terminal 115 from the access point 135(1) to a target access point 135(N), relatively faster roaming may be provided to the user.

Using a proxy connection, in one embodiment, the mobile terminal 115 may perform all desired communication with the target access point 135(N) prior to an actual handover to establish a communication link based on a radio interface of the target access point 135(N). For example, use of link layer connectivity enables association between the mobile terminal 115 and the target access point 135(N), which may take few milliseconds otherwise when establishing the communication link without the use of the proxy connection. In this manner, the mobile terminal 115 proactively may prepare a connection to the target access point 135(N) on the existing communication link based on the communication enabled by a proxy access point. Accordingly, in some embodiments, delays associated with different layers in the mobile terminal 115 and the access points 135(1-N) may be significantly reduced including a delay in a link layer, such as in an IAPP layer.

Examples of the communication system 100 of FIG. 1 include a system based on an IEEE 802.11x protocol, although it should be understood that the present invention may be applicable to other systems or protocols that support multi-media, data, optical, and/or voice communication. For instance, short range protocols, such as Bluetooth™ may be used. That is, it should be understood, however, that the configuration of the communication system 100 of FIG. 1 is exemplary in nature, and that fewer or additional components may be employed in other embodiments of the communication system 100 without departing from the spirit and scope of the instant invention.

Consistent with one embodiment of the instant application, the Wi-Fi network may be based on a wireless network protocol that uses unregulated spectrum for establishing a connection, such as a wireless connection between the mobile terminal 115 and the wireless LAN 105. The Wi-Fi enabled communication device software (S/F) 130 may be based on the IEEE 802.11 standard. The mobile terminal 115 may be any Wi-Fi compliant wireless communication device that operates on a radio frequency (RF) signal, for example, 2.4 GHz for 802.11b or 11 g, 5 GHz for 802.11a or the like. For example, the mobile terminal 115 may take the form of any of a variety of devices, such as mobile terminals including cellular phones, personal digital assistants (PDAs), laptop computers, digital pagers, wireless cards, and any other device capable of accessing the wireless network 110.

For providing a wireless service to a user, the first transceiver 120 may use the Wi-Fi enabled communication device S/F 130 that enables the mobile terminal 115 to communicate with the wireless LAN 105. The mobile terminal 115 may automatically associate the user to the Wi-Fi network to the wireless LAN 105 that further enables access to data networks, such the Internet. In this way, the communication system 100 may enable a user of the mobile terminal 115 to receive a wireless service over a wireless connection to the wireless network 110, for example, a user of the mobile terminal 115 may communicate high-speed multimedia information including voice, data, and video content.

Essentially, the mobile terminal 115 may identify the Wi-Fi network associated with the access point 135(1) before connecting an authorized user to the wireless LAN 105. To this end, the Wi-Fi enabled communication device S/F 130 may detect the Wi-Fi network. In the communication system 100, a logical Wi-Fi network may be identified by a service set identifier (SSID) according to one embodiment of the present invention. The SSID may be broadcast in beacon frames for the Wi-Fi network. Once the Wi-Fi network is detected, the first transceiver 120 of the mobile terminal 115 may establish a Wi-Fi communication by exchanging one or more signaling messages between the mobile terminal 115 and the wireless LAN 105 over a wireless connection to the access point 135(1).

In operation, at the mobile terminal 115 associated with the access point 135(1), the Wi-Fi enabled communication device S/F 130 may detect an indication of roaming 145 to the target access point 135(N). For example, the indication of roaming 145 may refer to a signal/noise level drop or an attenuation level in the signal strength of the wireless connection to the access point 135(1) so that wireless connectivity between the mobile terminal 115 and the wireless LAN 105 may no longer be maintained. In response to the indication of roaming 145, the first transceiver 120 may communicate with the target access point 135(N) using an existing communication link 140(1) between the mobile terminal 115 and the access point 135(1).

According to one embodiment of the present invention, a proxy access point (AP) 147 may be provided at the access point 135(1) to logically represent the target access point 135(N) for the mobile terminal to communicate with the target access point 135(1) over the existing communication link 140(1) in response to the indication of roaming 145. The Wi-Fi enabled communication device S/F 130 may cause the mobile terminal 115 to associate with the proxy access point 147 to prepare a connection to the target access point 135(N) using the existing communication link 140(1) for handover.

The proxy access point 147 may enable a proactive communication with a next access point over the existing communication link 140(1) to prepare the mobile terminal 115 for a handover event 150 from the access point 135(1) to the target access point 135(N). For example, the handover event 150 may refer to transfer of the mobile terminal 115 from the access point 135(1) to the target access point 135(N) when the Wi-Fi enabled communication device S/F 130 causes the first transceiver 120 to establish a communication link 140(N) between the mobile terminal 115 and the target access point 135(N). The Wi-Fi enabled communication device S/F 130 may use a backend channel 152 of the wireless network 110 to enable the proxy access point 147 to forward traffic 153 to the target access point 135(N).

The Wi-Fi enabled communication device S/F 130 may cause the mobile terminal 115 to communicate with the proxy AP 147 substantially in parallel to a connection with the access point 135(1) over the existing communication link 140(1). To handover a user to the target access point 135(N), the Wi-Fi enabled communication device S/F 130 may associate the mobile terminal 115 to the target access point 135 (N). Upon handover, the Wi-Fi enabled communication device S/F 130 may identify the mobile terminal 115 as a terminal that prepared a connection with the target access point 135(N) over a proxy connection.

By providing wireless connectivity over the communication link 140(N), the Wi-Fi enabled communication device S/F 130 may associate the mobile terminal 115 to the target access point 135(N) for an actual handover. In this way, the mobile terminal 115 may proactively prepare a connection to the next access point, i.e., the target access point 135(N) through the existing communication link 140(1). Accordingly, by enabling a make-before-break connection, a period during which substantially no communication is available between the mobile terminal 115 and the wireless LAN 105 may be significantly reduced.

Consistent with one embodiment, the access point 135(1) may comprise a second transceiver 160(1), such as Wi-Fi transceiver coupled to a storage 165(1) storing a Wi-Fi access point software (S/W) module 170(1). The communication system 100 may cause the Wi-Fi access point software (S/W) module 170(1) at the access point 135(1) to communicate with the mobile terminal 115 over the communication link 140(1). Likewise, consistent with one embodiment, the target access point 135(N) may comprise a second transceiver 160 (N), such as Wi-Fi transceiver coupled to a storage 165(N) storing a Wi-Fi access point software (S/W) module 170(N). The Wi-Fi access point S/W modules 170(1-N) may be defined at least in part by an Institute of Electrical and Electronics Engineers (IEEE) 802.11x standard, e.g., x=a, b, g etc.

In one embodiment, the Wi-Fi access point S/W modules 170(1-N) may comprise instructions to detect the indication of the roaming 145 for the handover event 150. For example, in a cellular network, the handover event 150 between the access point 135(1) and the target access point 135(N) may cause transfer of the mobile terminal 115 from one cell to another cell while a user is still on the call. That is, for the mobile terminal 115, the handover event 150 may involve passing of a call signal from one base station to the next base station as the user moves out of range or a base station, resulting in re-routing of the call. A change from one channel in one cell or sector to a different channel in a neighboring cell or sector may occur in some cases.

The access point 135(1) may host the proxy AP 147 to support a multiplicity of virtual access points. The Wi-Fi access point S/W module 170(1) may cause the access point 135(1) that hosts the proxy AP 147 to broadcast an indication of proxy connection for one or more neighboring access points for the mobile terminal 115 to virtually associate with a neighboring access point of the neighboring access points. Upon handover, the Wi-Fi access point S/W module 170(1) may identify the access point 135(1) as a terminal that prepared a connection with the target access point 135(N) over a proxy connection.

Figure 2:
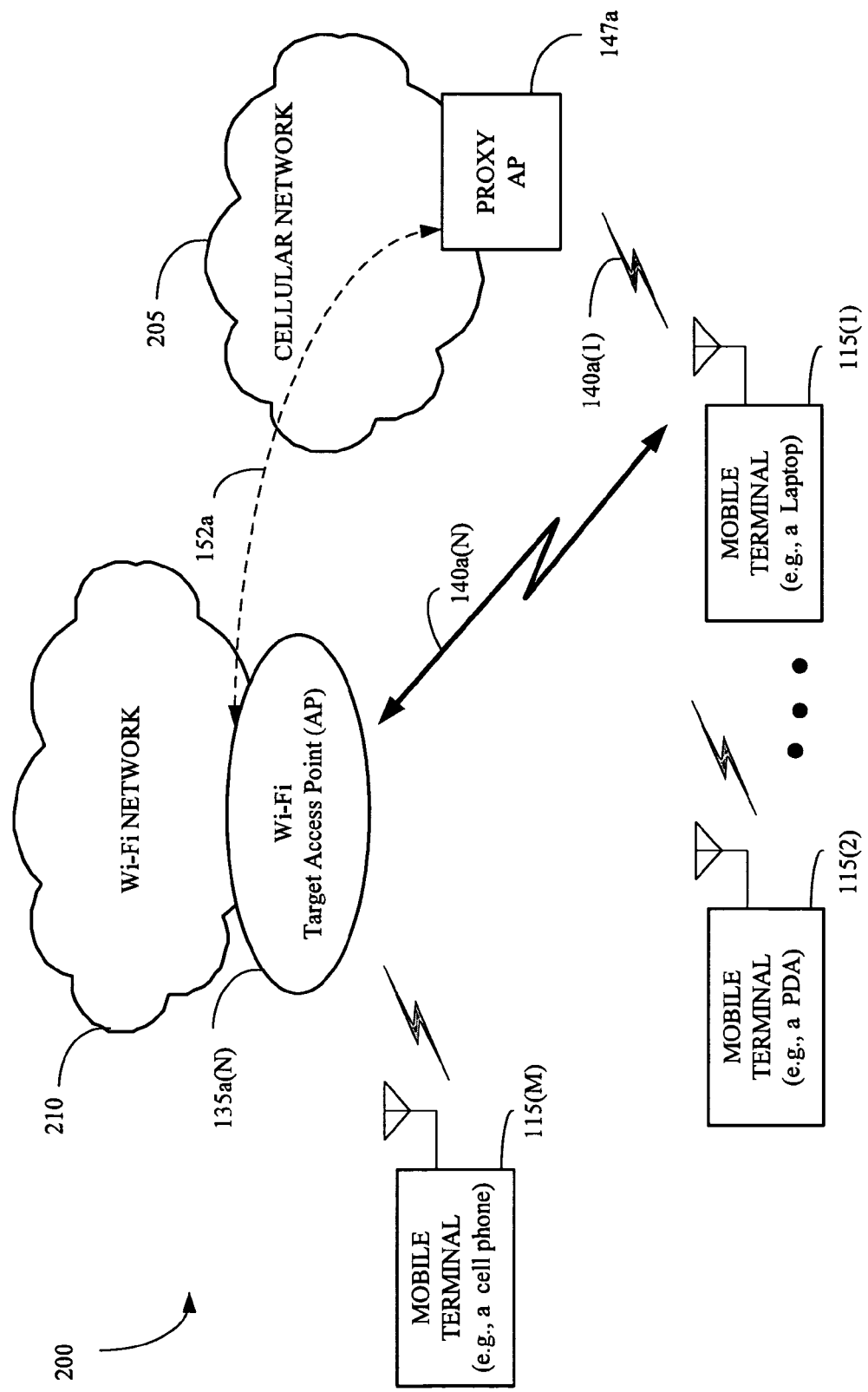
FIG. 2 schematically depicts a cellular communication system in which a different type of network, for example, a cellular network hosts a proxy access point according to one illustrative embodiment of the present invention.

Referring to FIG. 2, a cellular communication system 200 is illustrated in which a different type of network, for example, a cellular network 205 hosts a proxy AP 147a in accordance with one embodiment of the present invention. A proxy communication may take place over a cellular link 140a(1) between a mobile terminal 115(1) of a multiplicity of mobile terminals 115(1-M) and the proxy AP 147a when the mobile terminal 115(1) prepares for a handover to a Wi-Fi target access point (AP) 135a(N). The Wi-Fi target AP 135a (N) may be coupled to a Wi-Fi network 210, e.g., based on the IEEE 802.11 standard. The mobile terminal 115(1) may communicate with the Wi-Fi target AP 135a(N) via a backend channel connection 152a to prepare for an actual handover thereto from the cellular network 205.

The cellular network 205 may be coupled to a wide area network (WAN) and a network address may be used to identify a particular node (e.g., an access point). By examining a destination network address of a message from the mobile terminal 115(1), the proxy AP 147a may forward the message along a path from the message's source to the message's destination, i.e., the Wi-Fi target AP 135a(N) over the backend channel connection 152a. The Wi-Fi network 200 may treat the message in a manner as if the message is sent from the mobile terminal 115(1) over a radio frequency communication to the Wi-Fi target AP 135a(N). In this way, messages, such as text, voice, image information or other data may be transmitted over an air interface between the mobile terminal 115(1) and the cellular network 205 within a frequency range suitable for a particular wireless service or protocol of the cellular communication system 200.

Upon handover, the Wi-Fi network 210 may use a radio frequency (RF) in the 2.4 Giga Hertz (GHz) range to transmit data between the mobile terminal 115 (1) and the Wi-Fi target access point 135a(N) over a Wi-Fi communication link 140a (N). The Wi-Fi network 210 may be based on an IEEE 802.11x standard (x: a, b, g, etc.). Depending on local regulations, the IEEE 802.11 standard may allow use of up to fourteen Wi-Fi channels within the 2.4 GHz frequency range for deploying Wi-Fi hotspots.

In one embodiment, the Wi-Fi target AP 135a(N) may be a public Wi-Fi hotspot that refers to a single point within a cell or a sector where a relatively large number of users of the multiplicity of mobile terminals 115(1-M) may gather in a relatively small area, for example, an audience gathered in an auditorium or a cafe. To provide a wireless service, the Wi-Fi target access point 135a(N) may communicate with a server over an Ethernet wired network. The transmission and reception of data may use a TCP/IP protocol, and the Wi-Fi network 210 may be connected to the Internet.

Using an Internet Protocol (IP), one or more services including a telecommunication service in multiple broadband, quality of service (QoS)-enabled transport channels may be provided on a packet-based access network coupled to the Wi-Fi network 210. For providing an end-to-end service, the mobile terminal 115(1) and the Wi-Fi target AP 135a(N) comprise logical layers from application to physical layers. To perform handover, the wireless network 110 may use a variety of identification schemes to resolve addresses of packets in network traffic for a packet-based access network, such as an Internet Protocol (IP) network. Examples of the Internet Protocol include a version four of the Internet Protocol (IPv4) and a version six (IPv6). The IPv4 uses 32-bit unique addresses that can be allocated as public Internet addresses and is described in IETF RFC 791, published in September, 1981. The IPv6 uses 128-bit address to support up to about $3.4 \times 10^{38}$ public Internet addresses.

Figure 3:
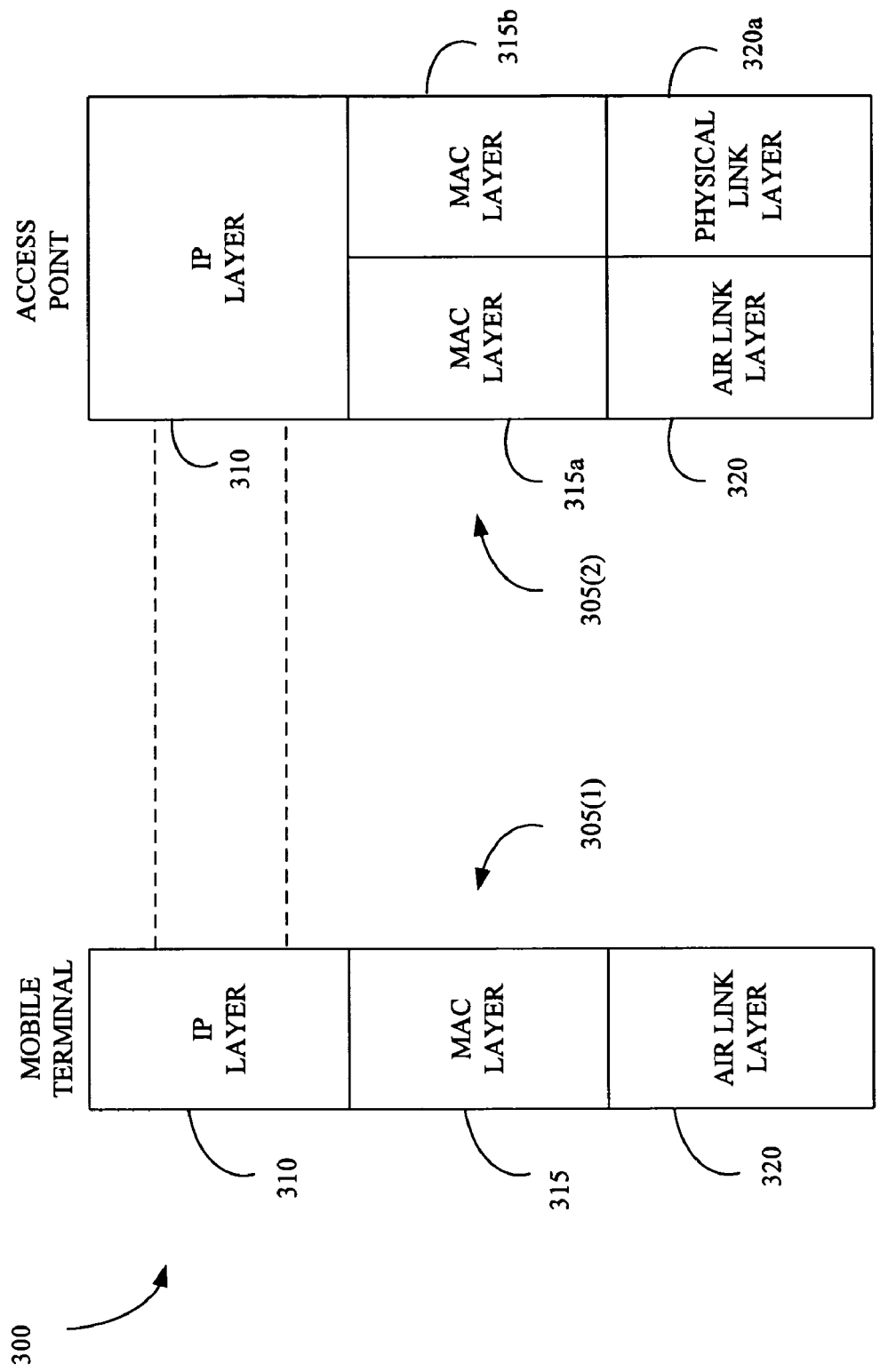
FIG. 3 illustrates an exemplary protocol stack that establishes connectivity in a link layer or an Internet Protocol layer to associate the mobile terminals shown in FIGS. 1 and 2 with the target access point and the Wi-Fi target access point, respectively, using a communication link consistent with one embodiment of the present invention.

Referring to FIG. 3, an exemplary protocol stack 300 is illustrated that establishes connectivity in a link layer or an Internet Protocol(IP) layer to associate the mobile terminal 115(1) with the Wi-Fi target AP 135a(N) using the communication link 140a(N) in accordance with one embodiment of the present invention. A protocol stack 305(1) is shown for the mobile terminal 115(1) and a protocol stack 305(2) is shown for the Wi-Fi target AP 135a(N). A network layer in these two protocol stacks 305(1-2) may include an Internet Protocol (IP) layer 310. A Medium Access Control (MAC) layer 315 may be shared across the protocol stacks 305(1-2). The MAC layer 330 may provide a networking protocol to handle transmission requests, authentication and other overheads in local area networking by being a portion of a data link layer that controls access to a communication channel. The MAC layer 330 is specified in the IEEE 802.xx standard for medium sharing, packets formats and addressing, and error detection. An air link layer 315 may specify a forward radio frequency (RF) channel directed from the Wi-Fi network 210 to the mobile terminal 115(1) a reverse RF channel directed from the mobile terminal 115(1) to the Wi-Fi network 210, as shown in FIG. 2.

An air link layer 320 of the protocol stacks 305(1-2) may form packets from data sent by higher-level layers and pass these packets down to a physical (PHY) link layer 320a in the protocol stack 305(2). The PHY link layer 320a may be the lowest layer in a network communication model for wireless networking to define use of signal modulation and RF transmission. The PHY link layer 320a corresponds to a radio front end and baseband signal processing section and may define parameters, such as data rates, modulation, signaling, transmitter/receiver synchronization, and the like. In the case of wireless communications, the PHY link layer 320a defines a transport medium, i.e., communication interface.

Figure 4:
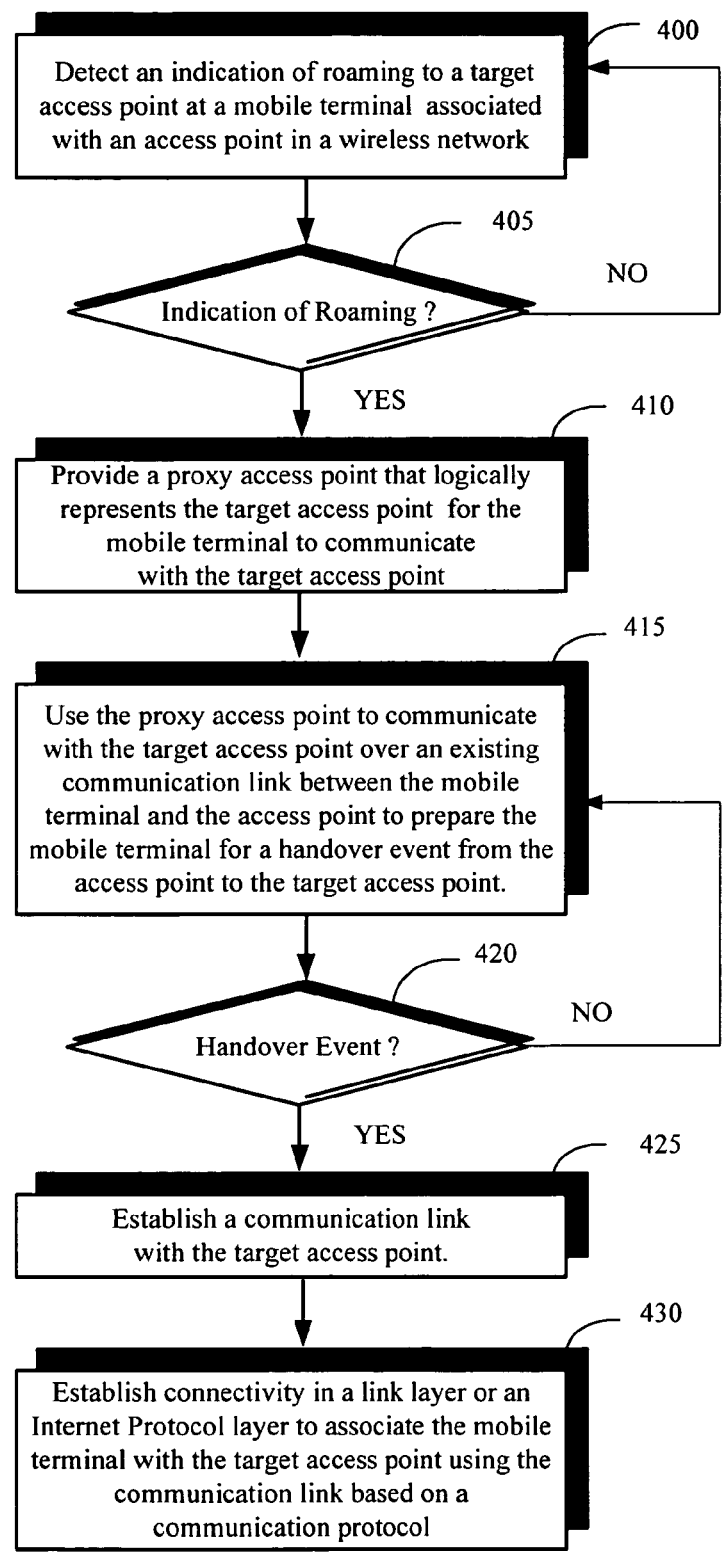
FIG. 4 is a flow diagram schematically illustrating one embodiment of a method of communication for a user that may be roaming between wireless access points in the wireless network shown in FIG. 1 that includes the wireless LAN comprising the access point and the target access point.

Referring to FIG. 4, a flow diagram schematically illustrates a method of communication for a user that may be roaming between wireless access points in the wireless network 110 that includes the wireless LAN 105 comprising the access point 135(1) and the target access point 135(N) according to one embodiment of the present invention. At Block 400, the Wi-Fi enabled communication device S/F 130 disposed at the mobile terminal 115 may detect the indication of roaming 145 to the target access point 135(N). To this end, at a decision block 405, the Wi-Fi enabled communication device S/F 130 may ascertain whether the indication of roaming 145 is indicated at the mobile terminal 115. If the indication of roaming 145 is determined to be present at Block 410, the proxy AP 147 may be provided at the access point 135(1) to logically represent the target access point 135(1) so that the mobile terminal 115 may communicate with the target access point 135(N) via the access point 135(1) before an actual handover.

At Block 415, the Wi-Fi enabled communication device S/F 130 may use the proxy AP 147 to communicate with the target access point 135(N) over the existing communication link 140(1) between the mobile terminal 115 and the access point 135(1). In this way, the mobile terminal 115 may prepare for handover from the access point 135(1) to the target access point 135(N) in response to the indication of roaming 145.

At a decision Block 420, the Wi-Fi enabled communication device S/F 130 may determine whether the handover event 150 is indicated at the mobile terminal 115. If occurrence of the handover event 150 is detected by the Wi-Fi enabled communication device S/F 130, at Block 425, the communication link 140(N) may be established between the mobile terminal 115 and the target access point 135(N). To establish the communication link 140(N), at Block 430, connectivity in a link layer or an IP layer, for example, the air link layer 320 and the physical link layer 320a or the IP layer 310, respectively, shown in FIG. 3, may be used to associate the mobile terminal 115 with the target access point 135(N) using the communication link 140(N).

Figure 5:
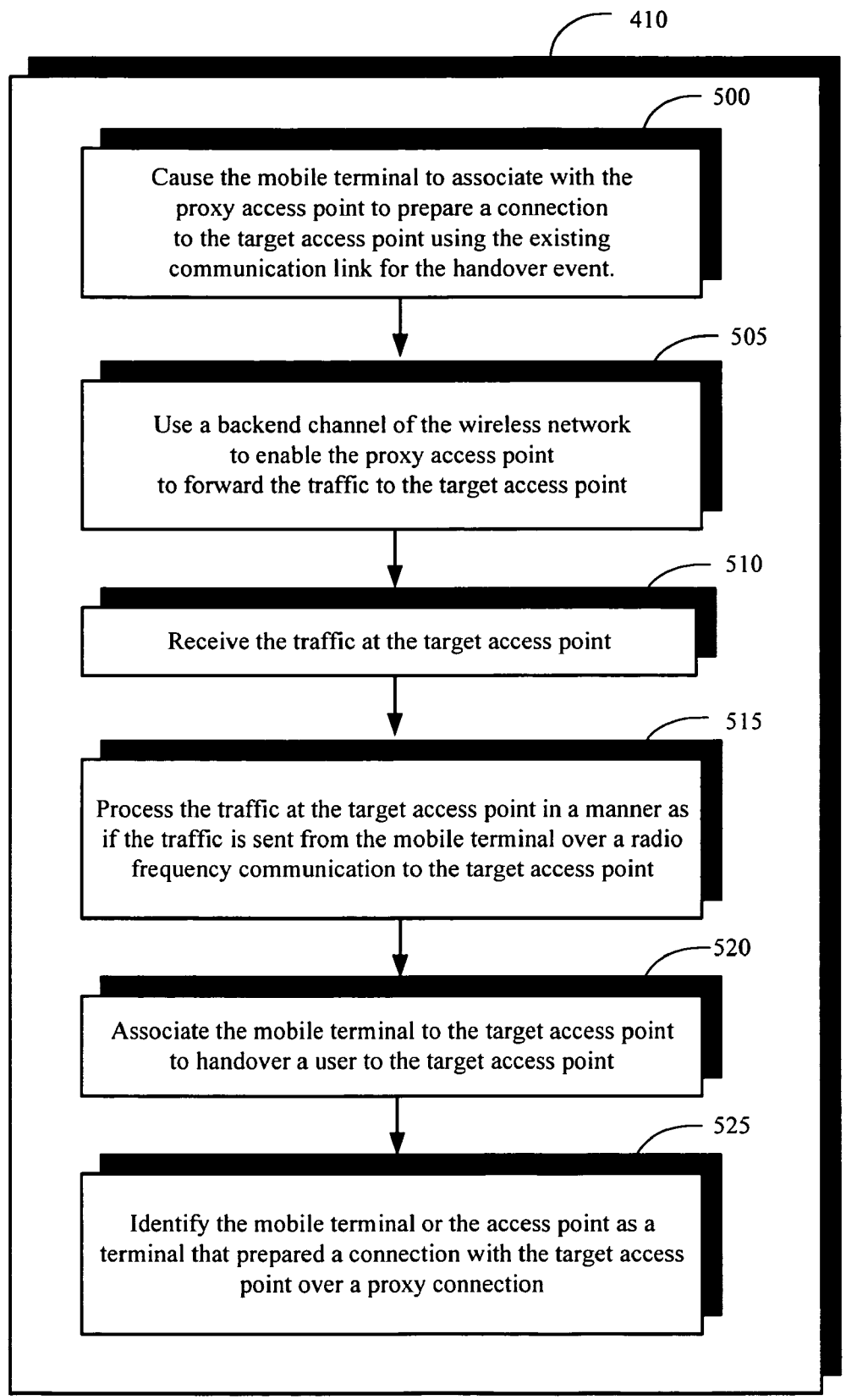
FIG. 5 schematically depicts a flow diagram for a method that provides a way to reduce the time during which no connection is available at the mobile terminal to mitigate undesirable effects of roaming between the access points in accordance with one illustrative embodiment of the present invention.

Referring to FIG. 5, a flow diagram schematically depicts a method that provides a way to reduce the time during which no connection is available at the mobile terminal 115, mitigating undesirable effects of roaming between the access points 135(1-N) in accordance with one illustrative embodiment of the present invention. More specifically, use of the proxy AP 147, as shown in FIG. 1, is illustrated to communicate with the target access point 135(N) for the handover event 150. That is, when the indication of roaming 145 is detected as the mobile terminal 115 moves away from the access point 135(1), the mobile terminal 115 may prepare a connection to maintain wireless connectivity to the wireless LAN 105. In this way, a connection to the wireless network 110 for a user at the mobile terminal 115 may be maintained without causing a significant disruption of for a wireless service during the handover event 150.

In response to the indication of roaming 145, the mobile terminal 115 may scan for a new access point associated with the wireless LAN 105, for example, using fourteen frequency bands to enable a smooth handover from the access point 135 to the target access point 135(N), as shown in FIG. 1. By using the proxy AP 147, indicated at the Block 410 in FIG. 4, the Wi-Fi enabled communication device S/F 130 may cause the mobile terminal 115 to first associate with the proxy AP 147, as shown at Block 500. This association of the mobile terminal 115 with the proxy AP 147, which may be hosted by the access point 135, prepares the mobile terminal 115 to establish a connection to the target access point 135(N) using the existing communication link 140(1).

The Wi-Fi enabled communication device S/F 130 may use the backend channel 152 over a backend network, i.e., the wireless network 110 coupled to the wireless LAN 105. The backend channel 152 may enable the proxy AP 147 to forward any traffic to the target access point. 135(N) directed thereto by the first transceiver 120 at the mobile terminal 115 over the existing communication link 140(1), as depicted in Block 505. Upon detection of the handover event 150 based on the indication of roaming 145, in one embodiment, the Wi-Fi access point S/F 170(1) may coordinate with the Wi-Fi access point S/F 170(N) stored in the storage 165(N) at the target access point 135(N) to communicate with the first transceiver 120 of the mobile terminal 115.

At Block 510, the target access point 135(N) may receive the network traffic intended for the target access point 135(N) via the backend channel 152. The target access point 135(N) may process this traffic in a manner as if the traffic is sent from the mobile terminal 115 over a radio frequency (RF) communication directly to the target access point 135(N), as shown in Block 515. To handover a user at the mobile terminal 115, the Wi-Fi enabled communication device S/F 130 may associate the mobile terminal 115 to the target access point 135(N) upon handover, as indicated in Block 520. Upon the handover event 150, the mobile terminal 115, or alternatively the access point 135, depending upon a particular implementation, may identify as a terminal that prepared a connection with the target access point 135(N) over a proxy connection through the proxy AP 147, as shown in Block 525.

In some embodiments, advantageously, such a proxy-based handover preparation by the mobile terminal 115 may reduce the time during which communication between the mobile terminal 115 and the wireless LAN 105 is temporarily disrupted, e.g., during handovers. To reduce the time between associations of the mobile terminal 115 to the access point 135(1) and to the target access point 135(N), the proxy AP 147 may provide information on the backend channel 152 on which the access point 135(1) may be transmitting the traffic 153. In this manner, the mobile terminal 115 may skip a probing phase when scanning for a new access point in response to the indication of roaming 145. Essentially, the mobile terminal 115 may use a particular frequency channel being used by the access point 135(1) for transmitting the traffic 153 to the target access point 135(N) over the communication link 140(N).

As such, to establish the communication link 140(N), a desired interaction between the mobile terminal 115 and the target access point 135(N) may be accomplished in advance of the handover event 150. That is, without using a radio interface of an access point, the mobile terminal 115 may authenticate, obtain an IP address, for example, a web-based authentication, updating a mobile IP registration, (if desired) or reconnecting existing TCP connections may be performed using the existing communication link 140(1) for the target access point 135(N).

In one embodiment, the proxy AP 147 may hosted by an access point (AP), e.g., the access point 135(1) relatively near to the proxied AP, i.e., the target AP 135(N). The access point 135(1) may use a multiplicity of virtual access points based on multiple SSIDs where an SSID may represent a virtual access point and may be mapped to a different virtual LAN (VLAN). For the proxy AP 147, one such VLAN may be forwarded to the access point 135(1)

By marking packets with an appropriate BSSID address field (e.g., a MAC layer address) to distinguish non-proxy packets from proxy packets, in one embodiment, the mobile terminal 115 may communicate with the proxy AP 147 in parallel to a connection to the access point 135(1) over the existing communication link 140(1). To this end, the access point 135(1) hosting the proxy AP 147 may provide desired link layer properties of a non-proxy or real AP. For example, the link layer properties may include encryption settings (including Wired Equivalent Privacy (WEP) keys for a security protocol that uses a series of keys on two end of a wireless transmission to encrypt data for secure transmission in a IEEE 802.11 compliant wireless network, i.e., the wireless network 110 to provide security), the SSID, the BSSID and the like. The parallel communication may provide a proxy connection that may be, for example, the IEEE 802.11 standard compliant.

Using the proxy connection, the mobile terminal 115 may perform desired communication to establish a new association with the target AP 135(N). To complete the handover, the mobile terminal 115 associates with the target AP 135(N), at which point the access point 135(1) identifies itself as a terminal that prepared the connection over the proxy connection. In another embodiment, the mobile terminal 115 may identify itself a terminal that prepared the connection over the proxy connection.

In some embodiments, the communication system 100 may use higher layer connectivity (for example, based on User Datagram Protocol (UDP) packets in a communications protocol for the Internet network layer, transport layer, and session layer) for proxy communication. In this way, for the access point 135(1) hosting the proxy 147 may not support use of multiple SSIDs. The hosting AP, i.e., the access point 135(1) may, for example, periodically broadcast the APs for which the access point 135(1) proxy's connections. In this way, mobile terminals may associate virtually with one of the APs using a suitable associate primitive.

In yet another embodiment, as shown in FIG. 2, a different type of network, for example, the cellular network 205 may host the proxy AP 147. In this case, proxy communication may take place over the cellular link 140a(1), and the mobile terminal 115(1) prepares a handover to the Wi-Fi target access point 135 defined at least in part by IEEE 802.11 standard.

Accordingly, in some embodiments, delays associated with different layers, as shown in FIG. 3, in the mobile terminal 115 or the mobile terminal 115(1) and the access points 135(1-N) or the Wi-Fi target access point 135, as shown in FIGS. 1 and 2, respectively, may be significantly reduced including a delay in a link layer, such as in an IAPP layer. Since the proxy AP 147 may indicate channel identification (ID), a probing delay associated with the roaming may be avoided for the handover event 150. In one embodiment, reestablishment of existing TCP connections may be avoided using this process. That is, a combination of the channel ID and mobile IP layer may be used. Such a proxy-based handover may be initiated by the mobile terminal 115, causing the mobile terminal 115 to select the next access point without sharing a state of the mobile terminal 115 with other access points, then the access point 135(1) to which the mobile terminal 115 is associated with.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of communication in a wireless network that includes a source access point and a target access point, the method comprising:

detecting an indication of roaming from the source access point to said target access point at a mobile terminal associated with said source access point;

in response to detecting said indication of roaming, establishing a proxy target access point that is a logical representation of the target access point, said proxy target access point being hosted by a host access point that is different than the target access point, the host access point being configured to broadcast an indication of proxy connection for one or more neighboring access points for said mobile terminal to virtually associate with a neighboring access point of said one or more neighboring access points;

establishing a proxy connection between the mobile terminal and said proxy target access point using an existing communication link between said mobile terminal and said source access point to prepare said mobile terminal for a handover event from said host access point to said target access point; and establishing a new communication link between said mobile terminal and said target access point using the proxy connection.

2. A method, as set forth in claim 1, wherein communicating with said target access point using an existing communication link further comprising:
   in response to said handover event, establishing a communication link with said target access point substantially after establishing the proxy connection between said mobile terminal and said proxy target access point.

3. A method, as set forth in claim 2, wherein establishing a communication link further comprising:
   establishing connectivity in a link layer or an Internet Protocol layer to associate said mobile terminal with said target access point using said communication link based on a communication protocol.

4. A method, as set forth in claim 1, further comprising:
   in response to detecting said indication of roaming, providing the proxy target access point that logically represents said target access point for said mobile terminal to communicate with said target access point over said existing communication link so that the proxy target access point can prepare a connection to the target access point.

5. A method, as set forth in claim 4, further comprising:
   causing said mobile terminal to associate with said proxy target access point to prepare a connection to said target access point using said existing communication link for said handover event.

6. A method, as set forth in claim 5, further comprising:
   using a backend channel of said wireless network to enable said proxy target access point to forward traffic to said target access point.

7. A method, as set forth in claim 6, further comprising:
   receiving said traffic at said target access point; and
   processing said traffic at said target access point in a manner as if said traffic is sent from said mobile terminal over a radio frequency communication to said target access point.

8. A method, as set forth in claim 4, wherein providing a proxy access point further comprising:
   hosting said proxy target access point by said source access point so that said source access point is also the host access point.

9. A method, as set forth in claim 4, wherein hosting said proxy target access point by said source access point further comprising:
   causing said source access point that hosts said proxy target access point to support a multiplicity of virtual access points.

10. A method, as set forth in claim 4, further comprising:
    causing said mobile terminal to communicate with said proxy target access point substantially in parallel to a connection with said host access point over said existing communication link;
    associating said mobile terminal to said target access point to handover a user to said target access point; and
    identifying said mobile terminal or said host access point as a terminal that prepared a connection with said target access point over a proxy connection.

11. A method, as set forth in claim 10, further comprising:
    causing said mobile terminal to communicate with said proxy target access point substantially in parallel to a connection with said another wireless network over a cellular link;
    associating said mobile terminal to said target access point to handover a user to said target access point; and
    identifying said mobile terminal or said another wireless network as a terminal that prepared a connection with said target access point over a proxy connection.

12. A method, as set forth in claim 4, wherein providing a proxy target access point further comprising:
    hosting said proxy target access point by another wireless network different than said wireless network.

13. A method, as set forth in claim 12, wherein hosting said proxy target access point by another wireless network further comprising:
    causing said mobile terminal to associate with said proxy target access point over a cellular link to said another wireless network.

14. A method, as set forth in claim 12, further comprising:
    causing said proxy target access point to communicate with said target access point to prepare said mobile terminal for said handover event that handovers a user from said another wireless network to said target access point.

15. A method of communication in a wireless network that includes a source access point and a target access point, the method comprising:
    detecting an indication of roaming from the source access point to said target access point for a mobile terminal at said source access point associated therewith;
    in response to detecting said indication of roaming, establishing a proxy target access point that is a logical representation of the target access point, said proxy target access point being hosted by a host access point that is different than the target access point, the host access point being configured to broadcast an indication of proxy connection for one or more neighboring access points for said mobile terminal to virtually associate with a neighboring access point of said one or more neighboring access points;
    communicating with said target access point using an existing communication link between said mobile terminal and said proxy target access point to prepare said mobile terminal for a handover event from said source access point to said target access point;
    establishing a proxy connection between the mobile terminal and said proxy target access point using an existing communication link between said mobile terminal and said source access point to prepare said mobile terminal for a handover event from said host access point to said target access point; and
    establishing a new communication link between said mobile terminal and said target access point using the proxy connection.

16. A mobile terminal associated with a wireless network that includes a source access point and a target access point, the mobile terminal comprising:
    a transceiver; and
    a storage coupled to said transceiver, said storage storing instructions to detect an indication of roaming from the source access point to said target access point from said access point and to cause said transceiver to:
    establish a proxy target access point that is a logical representation of the target access point, said proxy target access point being hosted by a host access point that is different than the target access point, the host access point being configured to broadcast an indication of proxy terminal to virtually associate with a neighboring access point of said one or more neighboring access points;
    communicate with said target access point using an existing communication link between said mobile terminal and said access point to use the proxy target access point to prepare said mobile terminal for a handover event from said access point to said target access point in response to detection of said indication of roaming;

establishing a proxy connection between the mobile terminal and said proxy target access point using an existing communication link between said mobile terminal and said source access point to prepare said mobile terminal for a handover event from said host access point to said target access point; and establish a new communication link between said mobile terminal and said target access point using the proxy connection.

17. A mobile terminal, as set forth in claim 16, wherein said source access point and said target access point are defined at least in part by the IEEE 802.11x standard.

18. An access point associated with a mobile terminal in a wireless network that includes a target access point, the access point comprising:

a transceiver; and a storage coupled to said transceiver, said storage storing instructions to detect an indication of roaming to said target access point from said access point for said mobile terminal and to cause said transceiver to:

establish a proxy target access point that is a logical representation of the target access point, said proxy target access point being hosted by the access point, which is configured to broadcast an indication of proxy connection for one or more neighboring access points for said mobile terminal to virtually associate with a neighboring access point of said one or more neighboring access points;

communicate with said target access point using an existing communication link between said mobile terminal and said access point to use the proxy target access point to prepare said mobile terminal for a handover event from said access point to said target access point in response to detection of said indication of roaming;

establish a proxy connection between the mobile terminal and said proxy target access point using an existing communication link between said mobile terminal and said source access point to prepare said mobile terminal for a handover event from said host access point to said target access point; and establish a new communication link between said mobile terminal and said target access point using the proxy connection.

19. An access point, as set forth in claim 18, wherein said access point and said target access point are defined at least in part by the IEEE 802.11x standard.

20. A communication system comprising:

a wireless network that includes an access point and a target access point each capable of communicating with a mobile terminal, said mobile terminal including:

a first transceiver; and a first storage coupled to said transceiver, said first storage storing instructions to detect an indication of roaming to said target access point from said access point and to cause said first transceiver to:

establish a proxy target access point that is a logical representation of the target access point, said proxy target access point being hosted by the access point, which is configured to broadcast an indication of proxy connection for one or more neighboring access points for said mobile terminal to virtually associate with a neighboring access point of said one or more neighboring access points;

communicate with said target access point using an existing communication link between said mobile terminal and said access point to use the proxy target access point to prepare said mobile terminal for a handover event from said access point to said target access point in response to detection of said indication of roaming;

establish a proxy connection between the mobile terminal and said proxy target access point using an existing communication link between said mobile terminal and said source access point to prepare said mobile terminal for a handover event from said host access point to said target access point; and establish a new communication link between said mobile terminal and said target access point using the proxy connection.

21. A communication system, as set forth in claim 20, wherein said access point including:

a second transceiver; and a second storage coupled to said second transceiver, said second storage storing instructions to detect an indication of roaming to said target access point from said access point for said mobile terminal and to cause said second transceiver to communicate with said target access point using an existing communication link between said mobile terminal and said access point to prepare said mobile terminal for a handover event from said access point to said target access point in response to detection of said indication of roaming, said wireless network is defined at least in part by the IEEE 802.11x standard.

22. An article comprising a computer readable storage medium storing instructions that, when executed cause a communication system to:

detect an indication of roaming to a target access point at a mobile terminal associated with a source access point;

establish, in response to detecting the indication of roaming, a proxy target access point that is a logical representation of the target access point, said proxy target access point being hosted by a host access point that is different than the target access point, the host access point being configured to broadcast an indication of proxy connection for one or more neighboring access points for said mobile terminal to virtually associate with a neighboring access point of said one or more neighboring access points;

communicate with said target access point using an existing communication link between said mobile terminal and said proxy target access point to prepare said mobile terminal for a handover event from said source access point to said target access point in response to detection of said indication of roaming;

establish a proxy connection between the mobile terminal and said proxy target access point using an existing communication link between said mobile terminal and said source access point to prepare said mobile terminal for a handover event from said host access point to said target access point; and establish a new communication link between said mobile terminal and said target access point using the proxy connection.

23. An article comprising a computer readable storage medium storing instructions that, when executed cause a communication system to:

detect an indication of roaming to a target access point for a mobile terminal at an access point associated therewith;

establish, in response to detecting the indication of roaming, a proxy target access point that is a logical representation of the target access point, said proxy target access point being hosted by said access point that is different than the target access point, the host access point being configured to broadcast an indication of proxy connection for one or more neighboring access points for said mobile terminal to virtually associate with a neighboring access point of said one or more neighboring access points;

communicate with said target access point using an existing communication link between said mobile terminal and said access point to prepare said mobile terminal for a handover event from said access point to said target access point in response to detection of said indication of roaming;

establish a proxy connection between the mobile terminal and said proxy target access point using an existing communication link between said mobile terminal and said source access point to prepare said mobile terminal for a handover event from said host access point to said target access point; and establish a new communication link between said mobile terminal and said target access point using the proxy connection.

* * * * *

UNITED STATES PATENT AND TRADEMARK OFFICE
CERTIFICATE OF CORRECTION

| | |
|---|---|
| PATENT NO. | : 7,668,140 B2 |
| APPLICATION NO. | : 11/126830 |
| DATED | : February 23, 2010 |
| INVENTOR(S) | : Jeroen Van Bemmel |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 367 days.

Signed and Sealed this

Twenty-eighth Day of December, 2010

David J. Kappos
*Director of the United States Patent and Trademark Office*